(No Model.)
O. H. PACKER.
PNEUMATIC TIRE.
No. 599,974. Patented Mar. 1, 1898.
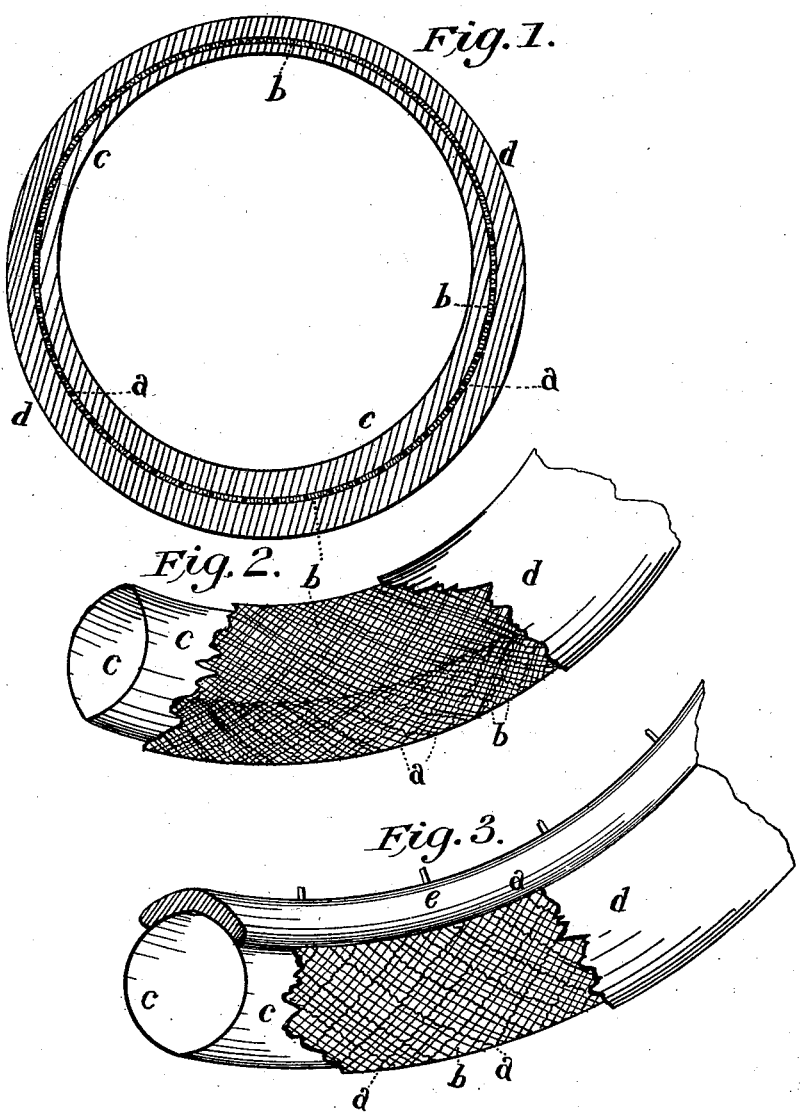
Witnesses.
Mrs. F. M. Packer.
W. R. Lee.
Orville H. Packer.
Inventor.

UNITED STATES PATENT OFFICE.

ORVILLE H. PACKER, OF JUNCTION, NEVADA.

PNEUMATIC TIRE.

SPECIFICATION forming part of Letters Patent No. 599,974, dated March 1, 1898.

Application filed March 22, 1897. Serial No. 628,759. (No model.)

*To all whom it may concern:*

Be it known that I, ORVILLE H. PACKER, a citizen of the United States, residing at Junction, in the county of Nye and State of Nevada, have invented a new and useful Pneumatic Tire, of which the following is a specification.

My invention relates to improvements in the pneumatic tires for bicycles, motor-cycles, horseless carriages, and similar vehicles.

The objects of my invention are, first, to secure a springing or flexible quality to the tire which will be conducive to ease in riding and to speed; second, to add strength to the tire; third, to render the tire as light as possible; and fourth, to prevent the tire from being punctured.

Figure 1 is a cross-sectional view of my improved tire. Fig. 2 is a cross-sectional and dissected view combined. Fig. 3 is also a combined cross-sectional and dissected view.

Similar letters represent similar parts throughout.

The ordinary rim of the tire is shown in Fig. 3 at $a$.

In the various views, $c$ represents the inner wall of the tube, composed of the ordinary rubber compound, and $d$ represents the outer wall of the tube, also made of a rubber compound, as usual.

A woven or braided fabric is represented by $a\ b$. This fabric is placed between the inner and outer walls of the tube, as usual.

My invention and improvement relates to the composition and structure of this fabric, which may be described as follows: The fabric is in every case composed of a combination of wire and ordinary textile material, such as cotton, linen, hemp, and the like. In making this fabric wire is substituted for textile threads at regular spaces both in the warp and woof, so that in the finished product the fabric has a checked appearance, the checks being approximately square or diamond-shaped. In the various views, $a$ represents the strands (warp and woof) of wire, and $b$ represents the ordinary textile threads.

In Fig. 1 the ends of the wire are seen as full dots and the ordinary textile threads as small circles. The drawings show one thread of wire to three of ordinary textile material; but I do not restrict myself to any definite proportions.

In Figs. 1 and 2 my combination of wire and textile material is confined to the "tread" of the tire, the remainder being ordinary fabric. The whole is made to form a continuous fabric—that is, there is no selvage along the sides of the tire. This forms a racing-tire and is made with a view to lightness. Fig. 3 shows a tire for ordinary use in which my combination of wire and textile material encircles the entire pneumatic tube.

Any method of manufacture in vogue may be employed to form my tire, one essential point being to thoroughly saturate my compound fabric with a rubber compound before placing it between the inner and outer layers of rubber compound to be pressed and vulcanized.

One of the principal features of my invention is the weaving or braiding of the strands spirally around the tube, as shown in Figs. 2 and 3. This assists in preventing puncture, for the wire strands draw closer together when the inflated tube is indented by the pressure of a pointed object, thus compressing the intervening threads of textile material into a dense and non-puncturable mass, while the resiliency of the tire remains unimpaired.

One of the objectionable features of tires containing wire as formerly made is that the wires cut through the rubber. This I obviate by interweaving or incorporating the wire into the textile fabric so that the threads of textile material hold the wires in place. The wires used are preferably quite small and woven so as to be crimped. The crimp aids in holding the wires in place, preventing their spreading to permit puncture.

One essential feature of my invention is that the wire and ordinary textile threads mutually aid each other in retaining their positions, thus preventing puncture more absolutely than either a wire screen or textile fabric used independently could do.

I am aware that a wire-cloth has been used between the inner and outer tubes and also in the body of the tube and also in sectional tires; but I do not claim such a tire. I know that a textile fabric composed of cotton, hemp, or the like is commonly used in tires to strengthen them and to resist puncture; but I do not broadly claim such a tire.

What I do claim, and desire to secure by Letters Patent, is—

1. The combination, in a bicycle-tire, of a compound fabric with the usual rubber compound substance of the bicycle-tire, the said fabric being composed of wires and textile threads interwoven or interbraided at that part of said fabric as will form the tread of the tire, the remainder of the fabric being plain textile material, the said fabric being woven or braided so that the textile threads run spirally around the tire-tube and the wires run diagonally across the tread of the tire all as described and for the purposes specified.

2. The combination, in a pneumatic tire, of an interwoven or interbraided compound fabric composed of wire and ordinary textile material with the substance of the tire; the said fabric being woven or braided with its threads running diagonally or spirally around the tube as described and for the purposes specified.

O. H. PACKER.

Witnesses:
   Mrs. F. M. PACKER,
   JOHN POOLEY.